(12) United States Patent
Eaton et al.

(10) Patent No.: US 8,329,797 B2
(45) Date of Patent: Dec. 11, 2012

(54) LOW DIELECTRIC LOSS POWER CABLE SHEATHS COMPRISING HIGH PRESSURE POLYOLEFINS FREE OF SILANE FUNCTIONALITY

(75) Inventors: Robert F. Eaton, Belle Mead, NJ (US); Paul J. Caronia, Annandale, NJ (US)

(73) Assignee: Dow Global Technologies LLC, Midland, MI (US)

( * ) Notice: Subject to any disclaimer, the term of this patent is extended or adjusted under 35 U.S.C. 154(b) by 414 days.

(21) Appl. No.: 12/668,038

(22) PCT Filed: Jul. 9, 2008

(86) PCT No.: PCT/US2008/069493
§ 371 (c)(1), (2), (4) Date: Jan. 7, 2010

(87) PCT Pub. No.: WO2009/012092
PCT Pub. Date: Jan. 22, 2009

(65) Prior Publication Data
US 2010/0319959 A1    Dec. 23, 2010

(51) Int. Cl.
*C08K 5/05* (2006.01)
*C08K 5/06* (2006.01)
(52) U.S. Cl. ........................ 524/386; 524/377
(58) Field of Classification Search .................... 524/386
See application file for complete search history.

(56) References Cited

U.S. PATENT DOCUMENTS

| 2,978,431 | A | * | 4/1961 | Eugle ............................ 524/376 |
| 4,144,202 | A |   | 3/1979 | Ashcraft et al. |
| 5,246,783 | A | * | 9/1993 | Spenadel et al. .............. 428/461 |
| 6,407,191 | B1 |   | 6/2002 | Mezquita et al. |
| 6,496,629 | B2 |   | 12/2002 | Ma et al. |
| 6,569,962 | B1 |   | 5/2003 | Zschoch et al. |
| 6,714,707 | B2 |   | 3/2004 | Rossi et al. |

FOREIGN PATENT DOCUMENTS

| EP | 0455092 A2 | 11/1991 |
| FR | 2753986 A1 | 4/1998 |
| WO | 2004031250 A1 | 4/2004 |

OTHER PUBLICATIONS

The Dow Chemical Company: "UCON Fluids & Lubricants", unknown, [online] Aug. 2002, USA, retrieved from the Internet: URL: http://www.dow.com/PublishedLiterature/dh_006d0901b8038006d367.pdf?filepath=ucon/pdfs/noreg/118-01299.pdf&fromPage=GetDoc.

* cited by examiner

*Primary Examiner* — Hui Chin
(74) *Attorney, Agent, or Firm* — Whyte Hirschboeck Dudek SC

(57) ABSTRACT

Power cables that comprise a sheath layer, e.g., an insulation layer, are produced from a mixture of a high pressure polyolefin free of silane functionality, e.g., high pressure low density polyethylene, and a polyether polyol of which at least 50 percent of its molecules comprise no more than a single hydroxyl functionality. Preferably, the power cable is a medium or high voltage power cable, and the polyolefin is crosslinked as the sheath layer is fabricated and/or subsequent to the fabrication of the sheath layer.

12 Claims, 1 Drawing Sheet

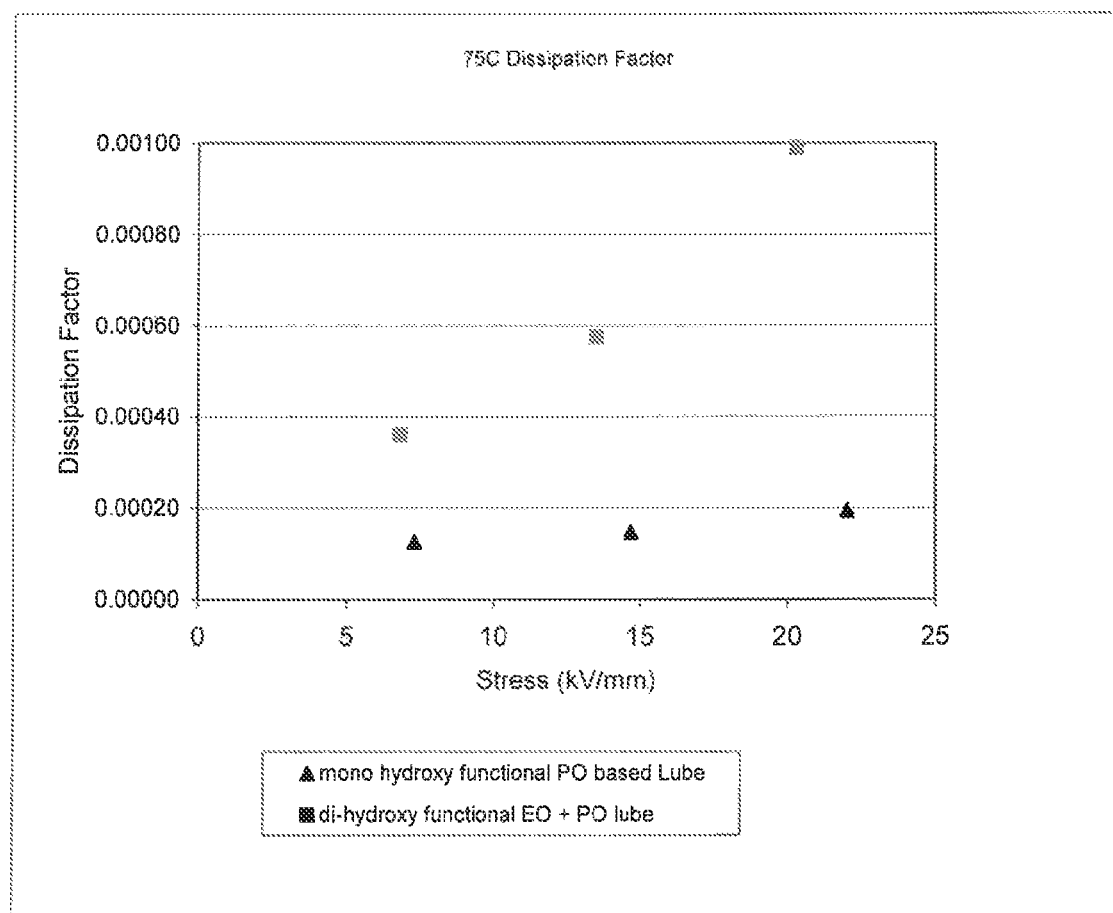

LOW DIELECTRIC LOSS POWER CABLE SHEATHS COMPRISING HIGH PRESSURE POLYOLEFINS FREE OF SILANE FUNCTIONALITY

FIELD OF THE INVENTION

This invention relates to power cables. In one aspect, the invention relates to power cables comprising one or more insulation sheaths while in another aspect, the invention relates to power cables in which the insulation sheath or sheaths comprise a high pressure polyolefin free of silane functionality. In still another aspect, the invention relates to the manufacture of the high pressure polyolefin free of silane functionality while yet in another aspect, the invention relates to the lubricant used in the hypercompressors that are used to generate the high pressure for the polyolefin manufacturing process.

BACKGROUND OF THE INVENTION

Typical electric power cables generally comprise one or more conductors in a cable core that is surrounded by several layers of polymeric materials including a first semi-conducting shield layer (conductor or strand shield), an insulating layer, a second semi-conducting shield layer (insulation shield), a metallic tape or wire shield, and a protective jacket. The outer semi-conducting shield can be either bonded to the insulation or strippable, with most applications using strippable shields. Additional layers within this construction, such as moisture impervious materials, are often incorporated.

Many cable sheaths, e.g., an insulation sheath, a protective jacket, etc., are prepared from high pressure polyolefins. e.g., high pressure low density polyethylene (HPLDPE). The manufacture of these polyolefins requires, as their name implies, high operating pressures, e.g., operating pressures of 70 to 350 megapascals (MPa, or about 10,000 to 50,000 psi) are typical with operating pressures of 240 to 310 MPa (about 35,000 to 45,000 psi) preferred. To achieve these high pressures, one or more hypercompressors are employed, and the operation of this equipment requires the use of lubricants. Unfortunately, given the high operating pressures and the nature of commercially available hypercompressor seals, lubricant inevitably leaks into the reactor, albeit at very low levels (e.g., parts per million) to mix with and become part of the reaction mass, e.g., ethylene, comonomer, solvent, catalyst, etc., and ultimately the reaction product, i.e., the high pressure polyolefin.

Traditionally, mineral oil has been used as a hypercompressor lubricant, but it is associated with substantial maintenance time for the hypercompressors. Polyhydroxy-functional polyalkylene oxide co-polyols, such as UCON™ PE-320, which is available from The Dow Chemical Company, is another group of hypercompressor lubricants. While these lubricants are generally better than mineral oil in the context of hypercompressor maintenance, their presence in the high pressure polyolefin product can have an adverse affect on the use of the polyolefin product both in processes in which the polyolefin is eventually crosslinked, and in the performance of the polyolefin in its intended use, even if the lubricant is present only in parts per million amounts.

Due to the presence of multiple hydroxyl groups and the hydrophilic ethylene oxide groups, these lubricants are quite hydrophilic. This can result in increased water uptake by the polymer and this, in turn, can adversely affect the properties of the article made from the polymer. For example, the presence of unwanted water and the polyhydroxyl functionality on the lubricant can increase the electrical losses of an insulation sheath made from the polyolefin when the sheath is exposed to the high electrical stress conditions of a medium or high voltage power cable. Increased electrical losses will, in turn, shorten the useful life of the power cable. Moreover, the presence of unwanted water and the polyhydroxyl functionality on the lubricant can result in scorch, i.e., pre-mature crosslinking of the polyolefin, during the process of fabricating the insulation sheath.

Accordingly, the polymer fabrication industry, particularly the wire and cable industry, has a continuing interest in compositions and methods for preparing cable sheaths comprising a high pressure polyolefin that will reduce electrical losses in medium and high voltage power cables.

SUMMARY OF THE INVENTION

In one embodiment, the invention is a composition comprising a (i) high pressure polyolefin free of silane functionality, and (ii) polyether polyol of which at least 50 percent of its molecules, i.e., 50 percent of the bulk polymer molecules, comprise no more than a single hydroxyl functionality.

In another embodiment, the invention is an extruded or molded article comprising a crosslinked high pressure polyolefin free of silane functionality and a polyether polyol of which at least 50 percent of its molecules, i.e., 50 percent of the bulk polymer molecules, comprise no more than a single hydroxyl functionality.

In another embodiment, the invention is a power cable that comprises a sheath layer, e.g., an insulation layer, which is produced from a mixture of a high pressure polyolefin free of silane functionality and a polyether polyol of which at least 50 percent of its molecules, 50 percent of the bulk polymer molecules, no more than a single hydroxyl functionality. Preferably, the power cable is a medium or high voltage power cable, and the polyolefin is cross linked as the sheath layer is fabricated or subsequent to the fabrication of the sheath layer.

BRIEF DESCRIPTION OF THE DRAWINGS

FIG. 1 is a graph reporting a comparison of the 75° C. dissipation factor (dielectric loss) of polyethylene made with UCON™ PE-320 compressor lubricant and polyethylene made with UCON™ PE-305 compressor lubricant at stress levels of 0-25 kilovolts per millimeter (kV/mm).

DESCRIPTION OF THE PREFERRED EMBODIMENTS

Definitions:

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of hydroxyl functionality in the bulk polyether polyol, the amount of lubricant relative to the polyolefin polymer free of silane functionality, and various temperature and other process ranges.

"Cable," "power cable" and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer", "copolymer" and like terms means a polymer prepared by the polymerization of at least two different types of monomers. These generic terms include copolymers, usually employed to refer to polymers prepared from two different types of monomers, and polymers prepared from more than two different types of monomers, e.g., terpolymers, tetrapolymers, etc. The term "interpolymer" includes all forms of interpolymers, e.g., random, block, etc.

"Bulk polymer" and like terms means the polymer as formed in a reactor, i.e., a collection of individual polymer molecules. Not all individual molecules of a bulk polymer are alike in all respects, e.g., length, monomer sequence, functionality, etc.

"Polyolefin" and like terms means a polymer derived from one or more simple olefin monomers, e.g., ethylene, propylene, 1-butene, 1-hexene, 1-oxtene and the like. The olefin monomers can be substituted or unsubstituted and if substituted, the substituents can vary widely. For purposes of this invention, substituted olefin monomers include vinyltrimethoxy silane, vinyl acetate, $C_{2-6}$ alkyl acrylates, conjugated and nonconjugated dimes, polyenes, vinylsiloxanes, carbon monoxide and acetylenic compounds. If the polyolefin is to contain unsaturation, then preferably at least one of the comonomers is at least one nonconjugated diene such as 1,7-octadiene, 1,9-decadiene, 1,11-dodecadiene, 1,13-tetradecadiene, 7-methyl-1,6-octadiene, 9-methyl-1,8-decadiene and the like, or a siloxane of the formula $CH_2=CH-[Si(CH_3)_2-O]_n-Si(CH_3)_2-CH=CH_2$ in which n is at least one. Many polyolefins are thermoplastic and for purposes of this invention, can include a rubber phase. Polyolefins include but are not limited to polyethylene, polypropylene, polybutene, polyisoprene and their various interpolymers.

"High pressure polyolefin" and like terms means a polyolefin that has been produced under high pressure conditions, e.g., at a pressure of at least 70 MPa (10,000 psi). Representative high pressure polyolefins are those made by the high pressure processes described in U.S. Pat. Nos. 6,407,191 and 6,569,962.

"Hydrophobic polyether polyol" and like terms means that the polyether polyol will absorb 10 wt % or less water at equilibrium at 100% humidity and under ambient conditions. By way of example, both UCON PE-305 and UCON PE-320 are polyalkylene oxide polyols but the former is hydrophobic while the latter is hydrophilic.

The phrase "characterized by the formula" is not intended to be limiting and is used in the same way that "comprising" commonly is used. The term "independently selected" is used to indicate that the R groups, e.g., R and $R^1$ can be identical or different R and $R^1$ may be hydrocarbyls or R may be a hydrocarbyl and $R^1$ may be an inertly-substituted hydrocarbyl radical). Use of the singular includes use of the plural and vice versa. Named R groups will generally have the structure that is recognized in the art as corresponding to R groups having that name. These definitions are intended to supplement and illustrate, not preclude, the definitions known to those of skill in the art.

"Hydrocarbyl" means a univalent hydrocarbyl radical, typically containing 1 to 30 carbon atoms, preferably 1 to 24 carbon atoms, most preferably 1 to 12 carbon atoms, including branched or unbranched, saturated or unsaturated species, such as alkyl groups, alkenyl groups, aryl groups, and the like.

"Inertly-substituted hydrocarbyl" and like terms means hydrocarbyl substituted with one or more substituent atoms or groups, which do not undesirably interfere with the desired reaction(s) or desired properties of the resulting coupled polymers (e.g., aromatics).

"End-capping radical," "end-capping group" and like terms means a radical or group that is not reactive with other reagents or products present during the cure or cross-linking process of polyolefin free of silane functionality of this invention, and includes but is not limited to an alkyl radical (e.g., $C_{1-20}$, preferably a $C_{1-8}$, alkyl), an ester radical and a urethane radical.

"Alkyl" means a straight-chain, branched or unbranched, saturated hydrocarbon radical. Suitable alkyl radicals include, for example, methyl, ethyl, n-propyl, i-propyl, n-butyl, t-butyl, i-butyl (or 2-methylpropyl), hexyl, octyl, etc. In particular embodiments of this invention, alkyls have between 1 and 200, usually between 1 and 50, more typically between 1 and 20, and even more typically between 1 and 12, carbon atoms.

"Aryl" means an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. In particular embodiments, aryls have between 1 and 200 carbon atoms, between 1 and 50 carbon atoms or between 1 and 20 carbon atoms.

"High Pressure Low Density Polyethylene", "HPLDPE" and like terms mean an ethylene homo- or copolymer containing long chain branching (LCB), the polymer prepared by free-radical polymerization under a pressure of at least 70 MPa (10,000 psi). If a copolymer, the comonomer can be any molecule with an ethylcnic group available for polymerization with the ethylene monomer, but it is typically at least one $C_{3-20}$, more typically at least one $C_{3-12}$, alpha-olefin (α-olefin). Preferred α-olefins include propylene, 1-butene, 1-hexene and 1-octene.

"Long chain branching", "LCB" and like terms mean, in the context of an HPLDPE polymer for example, a branch chain extending from the polymer backbone, the branch chain comprising more than one carbon atom. If the HPLDPE is a copolymer, then the LCB comprises one carbon more than two carbons less than the total length of the longest comonomer copolymerized with ethylene. For example, in an ethylene/1-octene HPLDPE polymer, the LCB is at least seven carbons atoms in length. As a practical matter, the LCB is longer than the side chain resulting from the incorporation of the comonomer into the polymer backbone. The polymer backbone of an HPLDPE comprises coupled ethylene units.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Composition" and like terms means a mixture or blend of two or more components. In the context of a mix or blend of materials from which a cable sheath or other article of manufacture is fabricated, the composition includes all the components of the mix, e.g., polyolefin free of silane functionality, lubricant, filler and any other additives such as cure catalysts, anti-oxidants, flame retardants, etc.

"Catalytic amount" means an amount necessary to promote the reaction of two components at a detectable level, preferably at a commercially acceptable level.

"Weight average molecular weight" (Mw) and "number average molecular weight" (Mn) are well known in the polymer art and can be determined by, for example, gel permeation chromatography as described in WO 2004/031250 A1.

Lubricants:

The lubricant used in the practice of this invention is a hydrophobic polyether polyol of which at least 50, preferably at least 75 and more preferably at least 99, percent of the molecules of the bulk polymer comprise no more than one hydroxyl functionality, i.e., comprise either one or none hydroxyl functionality. The polyether mono- or non-hydroxyl functional molecule has more carbon content than its polyhydroxyl-functional polyalkylene oxide containing equivalent, and is characterized by the formula:

$$R-[O-R_1]_n-O-R_2$$

in which R is hydrogen or a $C_{1-20}$ hydrocarbyl or inertly-substituted hydrocarbyl radical, $R_1$ is a $C_{2-20}$ hydrocarbyl or inertly-substituted hydrocarbyl radical, $R_2$ is an end-capping radical, and n is an integer of 2-1000. $R_1$ and $R_2$ can be straight-chained or branched, e.g., if $[O-R_1]$ is derived from ethylene oxide, then $R_1$ is $-CH_2-CH_2-$, if $[O-R_1]$ is derived from propylene oxide, then $R_1$ is $-CH_2-CH_2(CH_2)-$ in which $(CH_2)$ designates a branch. Preferably, $R_1$ is a $C_{3-20}$ hydrocarbyl. In one embodiment, the end capping radical is an alkyl or an inertly substituted alkyl radical.

Procedures for measuring or determining the percentage of molecules containing no more than one hydroxyl functionality in a bulk polymer of polyether polyol are known to those of skill in the art, and can vary to convenience. One procedure of convenience is gel permeation chromatography in which the hydroxyl functionality is tagged with an appropriate marker, phenylisocyanate. The percentage of molecules comprising one or none hydroxyl functionality can be expressed in terms of weight percent based on the total weight of the bulk polymer.

Polyether polyols can be manufactured by the catalyzed addition of epoxies (cyclic ethers) to an initiator. Cyclic ethers include but are not limited to propylene oxide (PO), ethylene oxide (EC)), butylene oxide, styrene oxide, cyclohexene oxide, and various mixtures of two or more of these oxides. These oxides react with active hydrogen-containing compounds, which are referred to as initiators, including but not limited to water, glycols, polyols and amines; thus, a wide variety of compositions of varying structures, chain lengths, and molecular weights are possible. By selecting the proper oxide or oxides, initiator, and reaction conditions and catalysts, it is possible to synthesize a series of polyether polyols that range from low-molecular-weight polyglycols to high-molecular-weight resins.

Polyether polyols can be prepared industrially by polyaddition of alkylene oxides to polyfunctional starter compounds including but not limited to alcohols, acids, or amines with base catalysis including but not limited to potassium hydroxide (KOH) (see, for example, Gum, Riese & Ulrich (ed.): "Reaction Polymers", Hanser Verlag, Munich, 1992, pp. 75-96). Following completion of the polyaddition, the basic catalyst is removed from the polyether polyol using any suitable method including but not limited to neutralization, distillation and filtration. Moreover, as chain length increases, polyether polyols prepared by base catalysis leads to an increase in the number of mono-functional polyethers terminating in double bonds.

Mono-hydroxyl polyether polyols, i.e., polyether polyols in which 50 percent or more of the bulk polymer comprises molecules containing no more than a single hydroxyl functionality, can be formed by addition of multiple equivalents of epoxide to low molecular weight mono-hydroxyl starters including but not limited to methanol, ethanol, phenols, allyl alcohol, longer chain alcohols, and various mixtures of two or more of these alcohols. Suitable epoxides include those described above. The epoxides can be polymerized using well-known techniques and a variety of catalysts, including but not limited to alkali metals, alkali metal hydroxides and alkoxides, double metal cyanide complexes. Suitable monohydroxyl starters can also be made, for example, by first producing a diol or triol and then converting all but one of the remaining hydroxyl groups to an ether, ester or other non-reactive group.

Useful mono-hydroxyl polyethers in this invention range in Mw from 100 to 3000, preferably from 200 to 2200. Other alkylene oxides, or blends of alkylene oxides, are useful and include but are not limited to mono hydroxyl functional butanol initiated propylene oxide of 2000 Mw. Polyether polyol hyper-compressor lubricants without hydroxyl functionality include acid, isocyanate and carbon-capped versions of the above. Alkylene oxides and blends of alkylene oxides can be prepared using methods well-known in the art.

Polyolefins:

The polyolefins used in the practice of this invention are high pressure polyolefins, particularly HPLDPE, free of silane functionality. "Free of silane functionality" means that the polyolefin does not contain, or contains only an inconsequential amount, either incorporated into or grafted onto its backbone, a silane group or radical such as those derived from silanes that comprise (i) an ethylenically unsaturated hydrocarbyl group, e.g., a vinyl, allyl, isopropenyl, butenyl, cyclohexenyl or gamma-(meth)acryloxy allyl group, and (ii) a hydrolyzable group, such as, for example, a hydrocarbyloxy, hydrocarbonyloxy, or hydrocarbylamino group. Representative silane functionalities are those derived from vinyl trimethoxy silane, vinyl triethoxy silane, and gamma-(meth)acryloxy propyl trimethoxy silane. Such functionality imparts hygroscopicity to the polyolefin, an undesirable property for an insulation sheath in a medium (3 to 60 kV) or high (>60 kV) voltage power cable.

HPLDPE free of silane functionality, which is produced in reactors under high pressure, is a preferred polyolefin for use in the practice of this invention. The molecular structure of high pressure low density polyethylene is highly complex. The permutations in the arrangement of its simple building blocks are essentially infinite. High pressure resins are characterized by an intricate, long chain branch molecular architecture. These long chain branches have a dramatic effect on the melt rheology of the resins. High pressure low density polyethylene resins also possess a spectrum of short chain branches generally 1 to 8 carbon atoms in length that control resin crystallinity (density). The frequency distribution of these short chain branches is such that, on the average, most chains possess the same average number of branches. The short chain branching distribution characterizing high pressure low density polyethylene can be considered narrow.

The Mw of the HPLDPE polymers free of silane functionality is typically at least 30,000, more typically at least 40,000 and even more typically at least 50,000. The maximum Mw of the HPLDPE polymers free of silane functionality of this invention typically does not exceed 750,000, more typically it does not exceed 500,000 and even more typically it does not exceed 400,000. The molecular weight distribution or polydispersity or Mw/Mn of these polymers is typically greater than 3, more typically between 3 and 6 and preferably between 3 and 5.

The melt index (MI) of the HPLDPE polymers used in this invention is typically at least 0.03, more typically at least 0.05 and even more typically at least 0.1. The maximum MI of the HPLDPE polymers of this invention typically does not exceed 50, more typically it does not exceed 30 and even more typically it does not exceed 20. The MI is measured by ASTM D1238 (Condition E) (190 C/2.16 kg).

The density of these polymers is typically between 0.900 and 0.950, more typically between 0.905 and 0.945 and preferably between 0.910 and 0.940. Density is determined in accordance with American Society for Testing and Materials (ASTM) procedure ASTM D792-00, Method 13.

The high pressure polymerization process used in the practice of this invention is well known in the art. See for example U.S. Pat. Nos. 6,407,191 and 6,569,962. Most commercial low density polyethylenes are polymerized in heavy walled autoclaves or tubular reactors at pressures up to 40,000 pounds per square inch (psi) or more. The temperature is typically between 70 and 320, preferably between 100 and 320 and more preferably between 120 and 320, ° C. If the HPLDPE is a copolymer, then the amount of comonomer used is typically between 0.5 and 35, preferably between 2 and 30 and more preferably between 5 and 25, weight percent based upon the combined weight of the ethylene and comonomer. Telomers and other process additives are used as desired in known amounts and known ways.

In another embodiment, the polyolefin polymer free of silane functionality includes but is not limited to copolymers of ethylene and unsaturated esters with an ester content of at least about 5 wt % based on the weight of the copolymer. The ester content is often as high as 80 wt %, and, at these levels, the primary monomer is the ester.

In a variation on this embodiment, the range of ester content is 10 to about 40 wt %. The percent by weight is based on the total weight of the copolymer. Examples of the unsaturated esters are vinyl esters and acrylic and methacrylic acid esters. The ethylene/unsaturated ester copolymers usually are made by conventional high pressure processes. The copolymers can have a density in the range of about 0.900 to 0.990 g/cc. In yet another embodiment, the copolymers have a density in the range of 0.920 to 0.950 g/cc. The copolymers can also have a melt index in the range of about 1 to about 100 g/10 min. In still another embodiment, the copolymers can have a melt index in the range of about 5 to about 50 g/10 min.

The ester can have 4 to about 20 carbon atoms, preferably 4 to about 7 carbon atoms. Examples of vinyl esters are: vinyl acetate; vinyl butyrate; vinyl pivalate; vinyl neononanoate; vinyl neodecanoate; and vinyl 2-ethylhexanoate. Examples of acrylic and methacrylic acid esters are: methyl acrylate; ethyl acrylate; t-butyl acrylate; n-butyl acrylate; isopropyl acrylate; hexyl acrylate; decyl acrylate; lauryl acrylate; 2-ethylhexyl acrylate; lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate: tetrahydrofurfuryl methacrylate; octyl methacrylate; 2-phenoxyethyl methacrylate; isobornyl methacrylate; isooctylmethacrylate; isooctyl methacrylate; and oleyl methacrylate. Methyl acrylate, ethyl acrylate, and n- or t-butyl acrylate are preferred. In the case of alkyl acrylates and methacrylates, the alkyl group can have 1 to about 8 carbon atoms, and preferably has 1 to 4 carbon atoms.

The high pressure polyolefin polymer free of silane functionality of the present invention also includes ethylene ethyl acrylate, ethylene, butyl acrylate, ethylene vinyl acetate, vinyl ether, ethylene vinyl ether, and methyl vinyl ether. One example of commercially available ethylene vinyl acetate is AMPLIFY™ 101 available from The Dow Chemical Company.

The high pressure polyolefins free of silane functionality used in the practice of this invention can be used alone or in combination with one or more other polyolefins, e.g., a blend of two or more polyolefin polymers that differ from one another by monomer composition and content, catalytic method of preparation, etc. If the polyolefin is a blend of two or more polyolefins, then the polyolefin can be blended by any in-reactor or post-reactor process.

Polymer Composition:

The polymer composition from which a cable sheath or other article of manufacture is fabricated comprises a polyolefin free of silane functionality and a polyether polyol with single hydroxyl functionality, or without any hydroxyl functionality. The polyether polyol with single hydroxyl functionality or without any hydroxyl functionality hyper-compressor lubricant comprises typically less than 300, preferably less than 100, parts per million (ppm) of the composition.

Preparation of a cable sheath, including but not limited to an insulation jacket, with a polymer composition as described above will reduce the amount of electrical loss in a polyolefin polymer free of silane functionality relative to a polymer composition comprising a polyether polyol with polyhydroxyl functionality, i.e., two or more hydroxyl functionalities. In addition, the polarity of the lubricant will be reduced by using a polyether polyol with single hydroxyl functionality or without any hydroxyl functionality relative to using a polyether polyol with polyhydroxyl functionality.

The polymer composition from which the cable sheathing or other article of manufacture is made can be filled or unfilled. If filled, then the amount of filler present should not exceed an amount that would cause degradation of the electrical and/or mechanical properties of the silane-modified polyolefin. Typically, the amount of filler present is between greater than 0 and 60, preferably between 0 and 30, weight percent based on the weight of the polymer. Representative fillers include clay, magnesium hydroxide, silica, calcium carbonate.

Other additives can be used in the preparation of and be present in the polymer composition of this invention, and these include but are not limited to antioxidants, processing aids, pigments and lubricants.

Compounding of the polyolefin polymer free of slime functionality and lubricant can be effected by standard means known to those skilled in the art. Examples of compounding equipment are internal batch mixers, such as a Banbury™ or Bolling™ internal mixer. Alternatively, continuous single or twin screw mixers can be used, such as a Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Articles of Manufacture:

The polymer composition of this invention can be applied to a cable as a sheath in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. Typically, the polyolefin is crosslinked as the sheath layer is fabricated and/or subsequent to the fabrication of the sheath layer. In a preferred embodiment of this invention in which the polyolefin polymer contains long chain or other types of branching with a melt index ($I_2$ of 1 to 7 g/10 min), the insulation sheath coated onto the cable will cure in 1 to 10 days at ambient temperature.

Other articles of manufacture that can be prepared from the polymer compositions of this invention, particularly under high pressure and/or elevated moisture conditions, include fibers, ribbons, sheets, tapes, tubes, pipes, weather-stripping, seals, gaskets, foams, footwear and bellows. These articles can be manufactured using known equipment and techniques.

The following examples further illustrate the invention. Unless otherwise stated, all parts and percentages are by weight.

SPECIFIC EMBODIMENTS

Example 1

The electrical properties of polyethylene prepared using a hypercompressor and UCON™ PE-320 lubricant were compared to the electrical properties of polyethylene prepared using a hyper-compressor and UCON™ PE-305 lubricant. Both UCON™ PE-320 and UCON™ PE-305 are synthetic lubricants made from polyalkylene glycol-base stock polymer and both are available from The Dow Chemical Company). Less 50 percent of the molecules of UCON™ PE-320 lubricant have one or none single hydroxyl functionality or, in other words, at least 50 percent of the molecules comprise two or more hydroxyl functionalities. At least 50 percent of the molecules of UCON™ 305 have no more than one hydroxyl functionality. The samples contained less than 300 ppm of lubricant.

Flat plaques of the prepared polyethylene were tested for high stress electrical properties. Plaques of polyethylene were compressed and molded after mixing with between 1.3 and 1.7 wt % dicumyl peroxide and not more than 0.37 wt % of an antioxidant mixture comprising a phenyl phosphite, a hindered amine light-stabilizer, and distearylthiodipropionate.

For preparation of the plaques, a steam press was preheated to 120 C. Pellets were pressed between two Mylar sheets under low pressure (6.89 MPa (1,000 psig) on single press or 17.2 MPa (2,500 psig) for double press) for 2 minutes and high pressure (17.2 MPa (2,500 psig) on single press or 25 ton for double press) for 3 minutes. The plaques were cooled to ambient temperature under high pressure for 10 minutes.

Dielectric loss in polymer theory and practice is exposited in "Anelastic and Dielectric Effect in Polymer Solids" by McCrum et al. (Whiley Publisher). Electrical loss was measured with an appropriate high voltage bridge, such as the Soken DAC-PSC-UA. The bridge was connected to a test cell like the DAC-OBB-7 with an appropriate reference capacitor and high voltage power supply. A film of the test polymer was placed in the test cell, which was then filled with a dielectric oil to prevent flashover at elevated voltage, typically 1-10 kV. The test cell was placed in a controlled temperature oven and allowed to come to thermal equilibrium with the bath. Voltage was the applied and the tangent delta (electrical loss) of the sample was read from the bridge.

The tangent delta for the polyethylene, DXM-496 (a 2.3 melt index, 0.92 g/cc low density polyethylene) produced with UCON™ PE-320, was compared to the tangent delta for DXM-496 prepared with UCON™ PE-305. As shown in FIG. 1, the tangent delta for the polyethylene prepared with UCON™ PE-320 was much lower than the tangent delta for the polyethylene prepared with the UCON™ PE-305. The dissipation factor of PE-305 was similar to mineral oil and much less than UCON™ PR-320 at the stress levels studied (kV/mm).

The polyethylene prepared from UCON™ PE-305 lubricant displayed reduced high stress dielectric loss as compared to the same polyethylene prepared with UCON™ PE-320 lubricant.

Although the invention has been described in considerable detail by the preceding specification, this detail is for the purpose of illustration and is not to be construed as a limitation upon the following appended claims. All U.S. patents, allowed U.S. patent applications and U.S. patent application Publications are incorporated herein by reference.

What is claimed is:

1. A cable sheath comprising a crosslinked, high pressure polyolefin free of silane functionality and a hydrophobic polyether polyol of which at least 50 percent of its molecules comprise no more than a single hydroxyl functionality.

2. The cable sheath of claim 1 in which the high pressure polyolefin free of silane functionality is selected from the group consisting of: HPLDPE, ethylene vinyl acrylate, ethylene butyl acrylate, and ethylene ethyl acetate.

3. The cable sheath of claim 2 in which the polyether polyol is of the formula:

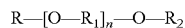

in which R is hydrogen or a $C_{1-20}$ hydrocarbyl or inertly-substituted hydrocarbyl radical, $R_1$ is a $C_{2-20}$ hydrocarbyl or inertly-substituted hydrocarbyl radical, $R_2$ is an end-capping group, and n is an integer of 2-1000.

4. The cable sheath of claim 3 in which the end-capping group is an alkyl or an inertly substituted alkyl radical.

5. The cable sheath of claim 4 in which $R_1$ is a $C_{3-20}$ hydrocarbyl or inertly-substituted hydrocarbyl radical.

6. The cable sheath of claim 5 in which R is hydrogen.

7. The cable sheath of claim 1 in which the polyether polyol comprises less than 300 ppm of the cable sheath.

8. The cable sheath of claim 1 in the form of an insulation layer of a power cable.

9. The cable sheath of claim 1 in the form of an insulation layer of a medium or high voltage power cable.

10. The cable sheath of claim 1 comprising filler.

11. The cable sheath of claim 1 free of filler.

12. The cable sheath of claim 1 in which the weight average molecular weight of the polyether polyol is between 100 and 3,000 g/mol.

* * * * *